July 16, 1929. N. M. BAKER 1,720,814
OPHTHALMIC MOUNTING
Filed Feb. 21, 1928
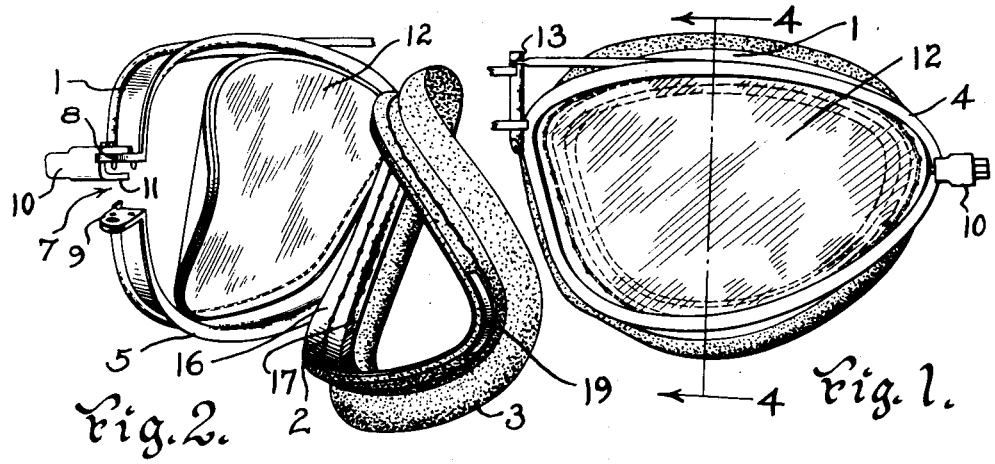
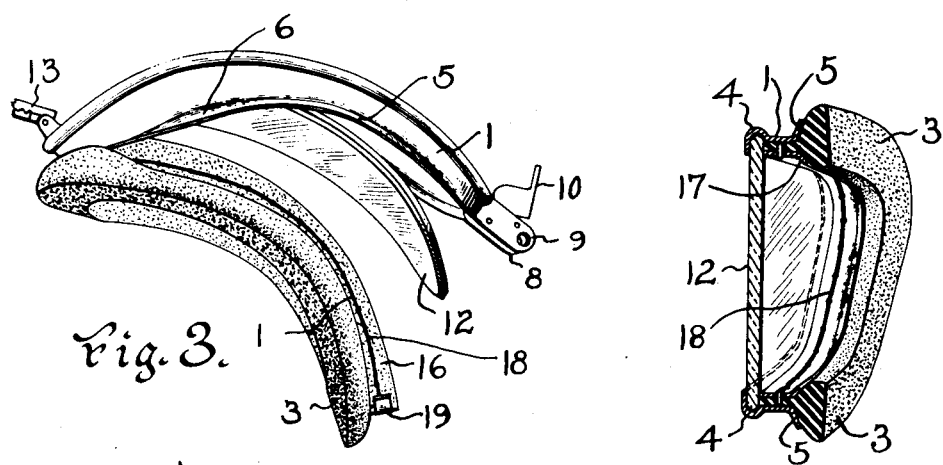
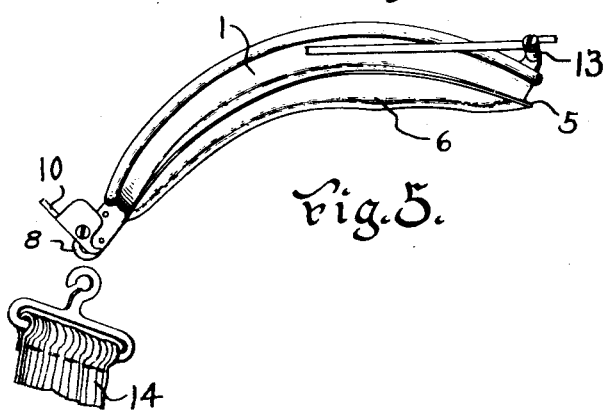
Inventor
Nelson M. Baker.
By Harry H. Styll
Attorney Patented July 16, 1929.

1,720,814

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed February 21, 1928. Serial No. 255,953.

This invention relates to improvements in ophthalmic mountings and has particular reference to a lens frame or eye cup particularly adaptable to protection glasses or goggles.

The principal object of the invention is to provide an improved lens holding rim and eye cup adapted to carry the lenses and face contacting means.

Another object of the invention is to provide improved face contacting means and their attachment which may be quickly and easily removed and replaced.

Another object of the invention is to provide simple, efficient and economical means for locking the lens in the face contacting means in the eye cup.

Another object of the invention is to provide simple, efficient and economical means for retaining a yielding face contacting member in proper shape and relationship.

Another object of the invention is to provide supporting means for a resilient face contacting member which prevents the same from being crushed out of line.

Another object of the invention is to provide improved means for attaching a resilient face contacting member to the eye cup.

Another object of the invention is to provide an improved eye cup shaped to fit the contour of the forehead or brow of the wearer.

Another object of the invention is to provide improved means for giving wide range of vision through the eye cup.

Other objects and advantages of the invention will become apparent from the following description taken in connection with the accompanying drawings, and it will be apparent that many changes in the arrangements of parts and details of construction may be made without departing from the spirit of the invention as expressed in the accompanying claims. I, therefore, do not wish to be limited to the exact details and arrangements shown and described as the preferred forms only have been shown by way of illustration.

Referring to the drawings:

Fig. 1 is a front elevation of an eye cup for an ophthalmic mounting of the goggle type;

Fig. 2 is a perspective view of the eye cup showing the parts separated;

Fig. 3 is a bottom plan view of Fig. 2;

Fig. 4 is a cross section on line 4—4 of Fig. 1;

Fig. 5 is a top or plan view of the eye cup showing the face contacting ring removed.

Fig. 6 is a partial view in cross section cut transversely to the frame of the eye cup showing how the resilient face contacting member is held and supported.

This invention is particularly applicable to goggles or eye protection means worn by aviators. It is well known that aviators, flying at the high speeds at which they fly, encounter great wind resistance. It is therefore, highly essential that the eye protection glasses which they wear are fitted absolutely snug to the face so that the air may not seep in around the contact of the goggle with the face, making it, therefore, of the first importance that means be provided by which the device is accurately shaped to the face. The eye protectors of these men form a very important part of their equipment and it is essential that they be as near correct as it is possible to make them, as there may be times when even their lives may be dependent upon their goggles. The resilient face contacting members of such devices should be kept fresh and thoroughly resilient. It is, therefore, essential that simple, secure and efficient means be provided for holding these face contacting members in shape and for allowing their facile removal and replacement, and this forms the prime object of the present invention.

Referring to the drawings, wherein similar reference characters denote corresponding parts throughout, the lens frame of the device comprises the lens holding rim 1 and a separable rim 2 for holding the face contacting member 3. The lens holding rim 1 is made preferably of shaped metal having the lens holding rim or flange 4 pressed therein and a supporting flange 5 on the opposite side thereof adapted to support the face contacting member 3. The inner edge of the lens holding rim 1 is shaped to fit the contour of the face, being wider at the portion 6, Figs. 3 and 5. This lens rim 1 is split on the temple side at 7 and has the offset endpieces 8 and 9 which are locked together by a hinged clamp 10.

This holds the lens 12 in the rims securely in place, the lens having a curvature to correspond with the curvature of the lens rim 1. Two of the lens rims 1 are secured together by a bridge member 13 to produce the complete ophthalmic mounting. They are held in place on the head by means of the head band 14 connected to the endpieces 8 and 9, this band connection tending to lock the clamp 10 in place so that it will not spring open.

The face contacting member 3 is preferably of soft rubber or other resilient material and has a broad face contacting portion 15 and a flange portion 16 extending therefrom. The flange 16 engages the side of the rim 2 which has an offset flange 17, see Fig. 6, to support the under side of the bearing portion of the face contacting member 3. The flange 16 is sewed at 18 to the ring 2, or it may be riveted, cemented or otherwise secured thereto.

The ring 2 is preferably an endless ring and the face contacting member 3 is preferably an endless ring. It will be noted by reference to Fig. 6 that the face contacting member 3 secured to the ring 2 is entirely separate from the lens holding rim 1 but is adapted to be seated in the rim 1 so that the flange 5 engages the under side of the supporting face 15 of the resilient ring 3. This face contacting member 3 is supported on one side by the flange 17 of the ring 2 and on the other side by the flange 5 of the ring 1. When the ring 2 carrying the face contacting member 3 is placed within the ring 1 it may be secured in place by bringing the endpieces 8 and 9 together and clamping down the clamp 10. By means of throwing in the clamp 10 both the lens and the face contacting member are securely held in place. To remove the face contacting member it is only necessary to unlock the clamp 10 and the lens may be taken out at the same time. The supporting flange 5 of the rim 1 and the supporting flange 17 of the rim 2 are shaped to fit the contour of the eye and provide a support for the resilient face contacting member 3 which will force the resilient member to fit varying contours in the eyes of different wearers. The pressure is created by the head band or the like 14.

On the temple side of the face contacting member 3 I have secured a buffer or engagement plate 19, see Figs. 2 and 3. This plate lies over the flange 16 of the face contacting member 3 and is so positioned that it is centrally of the endpieces 8 and 9 of the lens rim 1 when in place in the goggle. This acts as a buffer or wearing strip, its prime importance being to act as a guide when placing the resilient member within the rim 1.

It will thus be seen that I have provided simple, efficient and economical means for holding the lens rim and for holding the face contacting member in place, which means may be simply and easily removed for replacement.

Having described my invention, I claim:

1. In a device of the character described, a split lens rim having offset endpieces abutting each other and having lens holding means adjacent one end thereof and an offset supporting flange around the other end, a continuous ring having a flange fitting in the lens rim and having an offset marginal supporting flange, a resilient face contacting member having a rib secured to the continuous ring and extending portions overlying the supporting flanges of the rim and continuous ring, and means for securing the endpieces together to hold the lens and the continuous ring in the rim.

2. In a device of the character described, a lens rim having lens holding means thereon and an offset supporting portion, a separate ring fitting in the rim and having an offset supporting portion, a resilient face contacting member having a rib between the rim and ring and extending portions overlying the supporting portions of the rim and ring.

3. In a device of the character described, a lens rim having lens holding means thereon and an offset supporting portion, a separate ring fitting in the rim and having an offset supporting portion, a resilient face contacting member having a rib secured to the ring and lying between the ring and rim and extending portions overlying the supporting portions of the rim and ring.

4. In a device of the character described, a split lens rim having lens holding means thereon and an offset supporting portion, a separate ring fitting in the rim and having an offset supporting portion, a resilient face contacting member having a rib secured to the ring and lying between the rim and ring, extending portions overlying the supporting portions of the rim and ring and a sectional buffer strip over the rib of the face contacting member contrally of the split.

5. In a device of the character described, a split annular lens rim having an extending support, an annular ring having an extending support, an annular face contacting member having a rib and portions extending beyond the rib, and means for drawing the ends of the split rim together to compress the rib of the face contacting member between the rim and ring with the extending portions of the face contacting member overlying the extending supports of the rim and ring.

6. In a device of the character described, a split annular lens rim having an extending support, an annular ring having an extending support, an annular face contacting member having a rib and portions extending beyond the rim, said rib being secured to the annular ring, and means for drawing the ends of the split rim together to compress the rib between the rim and ring with the extending portions of the face contacting member overlying the extending supports of the rim and ring.

NELSON M. BAKER.